May 25, 1965　　　F. P. LACKINGER　　　3,185,247

AUTOMOBILE STALLING DEVICE

Original Filed July 17, 1961

INVENTOR.
FRANK P. LACKINGER
BY William D. Carothers
HIS ATTORNEY

United States Patent Office 3,185,247
Patented May 25, 1965

3,185,247
AUTOMOBILE STALLING DEVICE
Frank P. Lackinger, 309 Broadway Ave.,
McKees Rocks, Pa.
Continuation of abandoned application Ser. No. 124,464, July 17, 1961. This application Mar. 27, 1964, Ser. No. 356,353
3 Claims. (Cl. 180—82)

This invention relates generally to the method and device for stalling automobiles and more particularly to a destructible chamber mounted in a vulnerable position which when struck and fractured will cause the automobile to stop.

This invention is a continuation of patent application Serial No. 124,464, filed July 17, 1961, and now abandoned.

In the chase of a car the authorities frequently have a difficult time in overtaking the car. When automobiles had their gas tanks exposed in the rear it made an easy target for the authorities to shoot. A punctured hole in the gas tank would ordinarily stop the engine unless it was gravity fed. This is true regardless of whether the fuel pump was electric or vacuum operated as the supply of fuel to the engine depended upon no air being admitted to the fuel supply line between the fuel pump and the end of the fuel supply line within the fuel in the tank.

The principal object of this invention is the provision of a readily destructible chamber directly connected to the fuel supply line to immediately supply atmospheric pressure to the fuel supply line if the destructible chamber is fractured. The engine is thus starved when the carburetor is emptied causing the engine to stall.

The destructible chamber may be metal, glass, plastic or any other suitable material. It should be mounted on the car in a vulnerable place. A selective place would be the rear license plate. This chamber or bottle could be mounted directly behind the license plate so that it would be broken when the license plate was struck. The bottle or bulb need only be in this vicinity as the rear license plate is ordinarily visible and forms a ready target for shooting. The position of the rear license plate is ordinarily low and is not in the line of fire of the car's occupants or pedestrians. It is a good target because at night it is required to be lit up. Thus the chamber may be a part of the license itself. The chamber could be a sealed double wall of the metal license. It could be a glass covering over the face of the metal license.

The line connecting this chamber is connected directly with the fuel supply line and when the chamber is fractured or otherwise caused to leak, the air will be immediately sucked in by the fuel pump and no more gasoline can be supplied until this line is shut off. An automobile will readily stall when starved for fuel. Thus the type of engine makes little difference as they all must be supplied with fuel.

Other objects and advantages appear in the following description and claims.

The accompanying drawings show for the purpose of exemplification but without limiting the invention or claims thereto, certain practical embodiments of the invention wherein:

Figure 1:
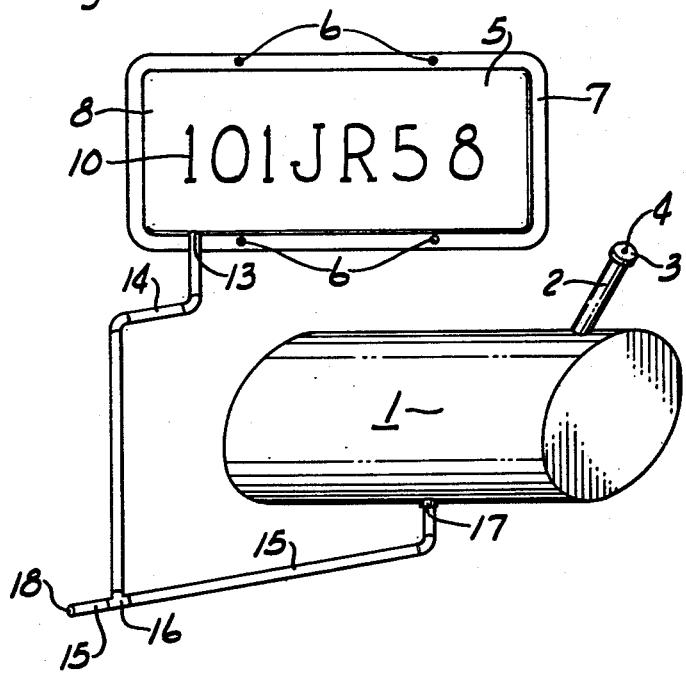
FIG. 1 is a diagrammatic view illustrating this invention.

Referring to FIG. 1 the number 1 represents the fuel tank having a filling spout 2 with a cap 3 which is provided with a small vent 4.

In the present automobile the gasoline tank is hidden under the trunk of the car and is very difficult to see. In some models it may protrude slightly below the automobile frame although this is not usual. In automobiles having rear motors the tank is frequently positioned in the front of the car below the dashboard. In any event, most automobiles are provided with a rear license plate such as illustrated at 5. Such a license plate is provided with holes 6 for mounting the same on the rear of the car in a prominent position. The area of the licenses is ordinarily illuminated by the rear taillight and if the license is positioned low it may be in the bumper or it may be in the back of the trunk. In any event, it is usually materially below the occupants of the car.

Figure 2:
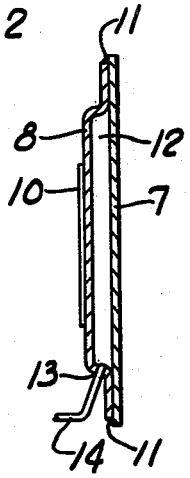
FIG. 2 is an enlarged view in cross section of the license plate shown in FIG. 1.

As shown in FIG. 2 the license plate 5 is constructed of a light metal having a back 7 and a front 8, the front 8 being formed with the indicia indicated at 10 that corresponds with the registration of the automobile. The front and back plates 7 and 8 are welded or otherwise joined along their marginal edges 11 so as to enclose a chamber 12 which chamber need not be very large but it is preferable to cover substantially the whole of the license plate as illustrated in FIG. 1. The chamber 12 is provided with a sealed connection 13 to the line 14 which line 14 is hermetically sealed and connected directly to the gas supply line 15 at the juncture 16 and preferably between the point where the gas supply line 15 enters the tank 1 as illustrated at 17 and the engine. Ordinarily this line would be directed to the fuel pump and thence to the carburetor. As illustrated in FIG. 1 the fuel line terminates at 18 and does not show the connection to the fuel pump or the engine except in FIG. 5.

The chamber 12 being a completely sealed chamber and being connected directly to the fuel supply line 15 must, of course, be exhausted to the extent of the suction on the system in order for the suction of the fuel pump of the engine to draw fuel from the fuel tank 1 through the fuel supply line 15 to operate the engine. Thus the engine maintains a suction in the exposed puncturable chamber 12 all the time the engine is running. However, if one were to strike or otherwise rupture either of the panels 7 or 8 of the license plate the vacuum would be broken and the fuel pump would thus draw air directly from the atmosphere through the license and the branch line 14 to the fuel supply line 15 which would stall the engine.

Figure 3:
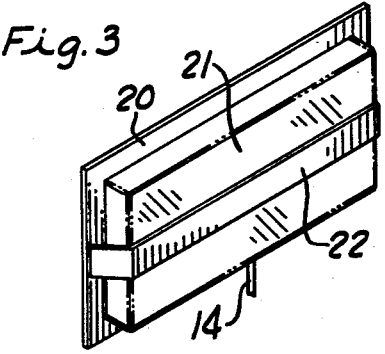
FIG. 3 is an enlarged view of a container secured to a license plate.
Figure 4:
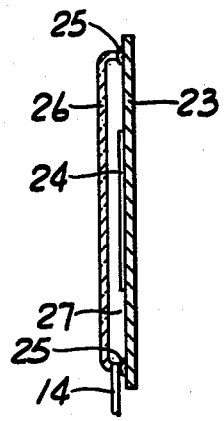
FIG. 4 is a sectional view of a modified form of this invention.

In the structure shown in FIG. 3 the license plate 20 has the glass bottle member 21, which is very fragile, secured to the rear face of the same by means of the strap member 22. This bottle may be shaped to conform to the recess made in the automobile for receiving the license plate. The bottle in turn is connected to the line 14 as illustrated in FIG. 1. Thus as the glass bottle 21 covers substantially the whole of the back of the license it would be vulnerable to a projectile which would destroy the same and allow air to be supplied directly to the fuel pump or the engine. In the structure of FIG. 4, the license plate 23 having the indicia on the face thereof as indicated at 24 is provided with an annular glass bead 25 to which is attached a light glass facing illustrated at 26 to form the chamber 27 between the glass 26 and the license plate 23. Here again the glass facing has secured thereto in sealed relation the tube 14. Glass may be applied to the surface of the metal for the purpose of attaching a glass structure thereto. Here again the glass surface 26 being smooth is readily cleaned and will always provide a surface that is readily maintained clean and makes the license readily readable even though it is in back of the glass and embossed in the license plate 23. Thus in each of the structures illustrated in FIGS. 2, 3 and 4 the license plate which is always required on every vehicle and is ordinarily positioned to be out of alignment from the occupants of the car provides a ready target for officers of the law to shoot at and thus stop the car being chased without further effort. In view of the fact that most states require inspection of automobiles such a requirement would be readily checked and each vehicle in the state would be required to be in good operative order before such inspection was approved.

By using this invention the authorities would always have an easy and less harmful target to shoot at and be assured that the car would stop.

Figure 5:
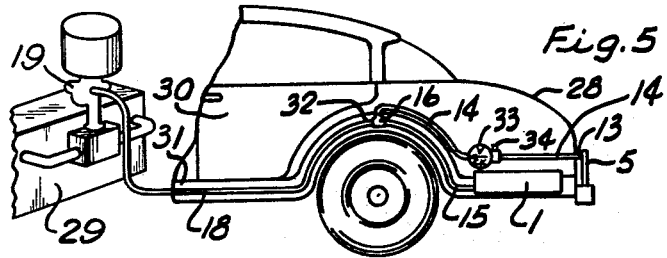
FIG. 5 is a diagrammatic view illustrating a check valve in the sealed line connection located within the trunk of the car.

Referring now to FIG. 5 the fuel tank 1 of the internal combustion engine is shown positioned under the trunk compartment 28 of the vehicle 30. The fuel supply line 15 travels along the frame 31 to the carburetor 19 on the engine 29 and the sealed line connection 14 between the destructible sealed chamber 5 and the fuel supply line 15 for the internal combustion engine is located at the hump of the frame indicated at 32. This is shown again as the T-connection 16. The sealed line 14 passes through the trunk 28 directly to the destructible sealed chamber 5 which has been previously described which may be formed into or be part of the license plate of the vehicle.

Intermediate of the line 14 a check valve 33 is inserted which will permit air to flow from a broken or destructible sealed chamber 5 to the juncture 16 where it is connected to the fuel supply line for the internal combustion engine. Here the seal line connection 14 is connected to the fuel line at a point higher than the fuel tank 1 which aids in preventing any fuel passing the T-connection 16 if there is a leak in the destructible sealed chamber 5. Owing to changes in temperature or differences in elevation the destructible sealed chamber 5 may create a vacuum or a reduction in pressure which would cause the fuel to be drawn up into the sealed chamber 5. To avoid this and thus avoid distribution of fuel at the moment a projectile strikes the destructible sealed chamber 5 the check valve 33 is employed which will close upon any fluid attempting to flow from the supply line 15 to the destructible sealed chamber 5.

If this structure is required by law to be employed by all motorists so that the proper authorities have an easy target for stopping a vehicle, then it is necessary to enable the car inspection authorities to check this system. This is accomplished by the removal of the screw 34 at the valve 33 which screw opens into the chamber connecting the line 14 and preferably on the destructible sealed chamber side of the valve 33. Unlocking the trunk 28 by the car inspecting officer permits him to unscrew the screw 34 and thereby check whether the car will immediately stall its running engine and when the screw is reinserted the system, including the puncturable chamber 5 secured to an externally exposed part of the vehicle and the line 14 having one end connected to the chamber, becomes re-established. The other end of line 14 is connected to the fuel suction line 15. The seal screw 34 may be used to also determine whether or not the check valve is functioning to prevent any flow of fluid from the juncture 16 to the destructible sealed chamber 5. Since this valve 33 is in the trunk and the screw 34 is also within the trunk the apparatus is not readily accessible to vandals. It is obvious that one might break the line 14 adjacent the destructible sealed chamber 5 but this would be no more likely than vandals breaking the fuel line connection to the fuel tank which is infrequent.

I claim:

1. A device for stalling a running internal combustion engine of a vehicle consisting of a fuel supply including a fuel suction line to said running engine, a hermetically sealed system including a puncturable chamber secured to an externally exposed part of the vehicle and a line having one end connected to said chamber and the other end connected to said fuel suction line of the running engine to maintain a suction in said hermetically sealed system while the engine continues to run, said puncturable chamber when punctured by an object such as a projectile permitting an influx of air to said system and said fuel suction line to stall the running engine.

2. A device for stalling a running internal combustion engine of a vehicle consisting of a fuel supply including a fuel suction line to said running engine, a hermetically sealed system including a puncturable chamber secured to an externally exposed part of the vehicle and a branch line having one end connected thereto, the other end of said branch line connected to said fuel suction line of the running engine to maintain a suction in said hermetically sealed system while the engine continues to run, a hermetically sealable inspection opening in said hermetically sealed system, said opening being disposed to admit air into the branch line for testing the operability of said puncturable chamber and said line, said puncturable chamber when punctured by an object such as a projectile permitting an influx of air to said system and said fuel suction line to stall the running engine.

3. A device for stalling a running internal combustion engine of a vehicle consisting of a fuel supply including a fuel suction line to said running engine, a hermetically sealed system including a puncturable chamber secured to an externally exposed part of the vehicle and a branch line having one end connected thereto, the other end of said branch line connected to said fuel suction line of the running engine to maintain a suction in said hermetically sealed system while the engine continues to run, a check valve in said branch line to prevent the flow of fluid to said chamber, a hermetically sealable inspection opening in said hermetically sealed system, said opening being disposed to admit air into the branch line, for testing the operability of said puncturable chamber and said line, said puncturable chamber when punctured by an object such as a projectile permitting an influx of air to said system and said fuel suction line to stall the running engine.

References Cited by the Examiner

UNITED STATES PATENTS 2,904,121   9/59   Honeyman _____ 180—82

A. HARRY LEVY, *Primary Examiner.*

PHILIP ARNOLD, *Examiner.*